(12) United States Patent
Liu

(10) Patent No.: US 11,212,092 B2
(45) Date of Patent: Dec. 28, 2021

(54) OPTIMIZED SECURITY KEY REFRESH PROCEDURE FOR 5G MC

(71) Applicant: NOKIA SOLUTIONS AND NETWORKS OY, Espoo (FI)

(72) Inventor: Yang Liu, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 16/091,403

(22) PCT Filed: Apr. 5, 2016

(86) PCT No.: PCT/CN2016/078431
§ 371 (c)(1),
(2) Date: Oct. 4, 2018

(87) PCT Pub. No.: WO2017/173561
PCT Pub. Date: Oct. 12, 2017

(65) Prior Publication Data
US 2019/0158282 A1    May 23, 2019

(51) Int. Cl.
*H04L 9/08* (2006.01)
*H04W 12/04* (2021.01)
(Continued)

(52) U.S. Cl.
CPC ........ *H04L 9/0891* (2013.01); *H04L 41/0816* (2013.01); *H04W 12/03* (2021.01);
(Continued)

(58) Field of Classification Search
None
See application file for complete search history.

(56) References Cited

U.S. PATENT DOCUMENTS 6,996,723 B1 *   2/2006   Kyojima ............... H04L 9/0822
                                                           380/45
2004/0218763 A1 *  11/2004  Rose .................... H04L 9/3247
                                                           380/277
(Continued)

FOREIGN PATENT DOCUMENTS

CN       101400059 A     4/2009
CN       101715188 A     5/2010
(Continued)

OTHER PUBLICATIONS

International Search Report & Written Opinion dated Jan. 3, 2017 corresponding to International Patent Application No. PCT/CN2016/078431.

(Continued)

*Primary Examiner* — William J. Goodchild
(74) *Attorney, Agent, or Firm* — Squire Patton Boggs (US) LLP

(57) ABSTRACT

There is provided a method. The method comprises generating, by the first network node, a new security key; informing, by the first network node, a user equipment of the new security key and when the first network node will start to use the new security key; obtaining, by the first network node, when the user equipment will start to use the new security key; and bringing, by the first network node, the new security key into use.

9 Claims, 4 Drawing Sheets

(51) Int. Cl.
  *H04W 12/03* (2021.01)
  *H04L 12/24* (2006.01)
  *H04L 29/06* (2006.01)
  *H04W 84/04* (2009.01)

(52) U.S. Cl.
  CPC .......... *H04W 12/04* (2013.01); *H04L 9/0866* (2013.01); *H04L 9/0869* (2013.01); *H04L 63/068* (2013.01); *H04L 2209/80* (2013.01); *H04W 84/042* (2013.01)

(56) References Cited

U.S. PATENT DOCUMENTS

| | | | | |
|---|---|---|---|---|
| 2006/0010206 | A1* | 1/2006 | Apacible | G06F 15/16 709/205 |
| 2010/0091993 | A1* | 4/2010 | Iwama | H04L 9/0819 380/273 |
| 2014/0337935 | A1* | 11/2014 | Liu | H04W 12/041 726/4 |
| 2015/0208240 | A1* | 7/2015 | Yang | H04W 12/08 726/6 |
| 2015/0304841 | A1* | 10/2015 | Zhang | H04W 12/041 380/279 |
| 2016/0029213 | A1 | 1/2016 | Rajadurai et al. | |

FOREIGN PATENT DOCUMENTS

| | | |
|---|---|---|
| CN | 103959829 A | 7/2014 |
| CN | 104918242 A | 9/2015 |
| CN | 104936175 A | 9/2015 |
| CN | 104969592 A | 10/2015 |
| EP | 2 197 147 A1 | 6/2010 |
| WO | 2014/087643 A1 | 6/2014 |

OTHER PUBLICATIONS

RAN (NEC): "Introduction of Dual Connectivity (RAN3 topics)", 3GPP Draft; R2-144027 R3-141966, 3rd Generation Partnership Project (3GPP), Mobile Competence Centre ; 650, Routes Des Lucioles ; F-06921 Sophia-Antipolis Cedex ; France, vol. RAN WG2, No. Dresden, Germany; Aug. 18, 2014-Aug. 22, 2014; Aug. 26, 2014.
Oct. 22, 2019 Extended Search Report issued in European Patent Application No. 16897496.2.
Chinese Office Action issued in corresponding Chinese Patent Application No. 201680086457.6 dated Nov. 25, 2020.
Chinese Office Action issued in corresponding Chinese Patent Application No. 201680086457.6 dated Jul. 16, 2021.

* cited by examiner

OPTIMIZED SECURITY KEY REFRESH PROCEDURE FOR 5G MC

FIELD OF THE INVENTION

The present invention relates to a method, an apparatus, and a computer program product for the fifth generation (5G) multi-connectivity (MC) technology. More particularly, the present invention relates to a method, an apparatus, and a computer program product for optimized security key refresh procedure for 5G MC.

BACKGROUND OF THE INVENTION

Abbreviations

AP Access Point
LTE Long Term Evolution
UE User Equipment
RRC Radio Resource Control
UP User Plane
CP Control Plane
RAN Radio Access Network
DC Dual Connectivity
MC Multi-Connectivity
PDU Protocol Data Unit
eNB E-UTRAN NodeB
MeNB Master eNB
SeNB Secondary eNB
PDCP Packet Data Convergence Protocol
NCS Network Convergence Sublayer
RLC Radio Link Control
MAC Medium Access Control
KDF Key Derivation Function
PCI Physical Cell Identifier
RACH Random Access Channel
SMC Security Mode Command
SN Sequence Number
DL DownLink
UL UpLink
RCS Radio Convergence Layer This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

In a forthcoming fifth generation communication system, an UE may establish multiple connection sessions with multiple cells, which is referred as multi-connectivity technology. Through the multi-connectivity technology, the UE may be connected with at least two access nodes (APs) that may be base stations or be eNodeBs or eNBs in LTE or 5G. The at least two access nodes may be at least one master access node (called as master eNB (MeNB) in LTE) that serves as a mobility anchor and at least one secondary access node (called as secondary eNB (SeNB) in LTE).

If a communication network contains a plurality of types of communication technologies, such as 4G communication technology, 3G communication technology, WiFi communication technology, and they possess their own APs, the UE may be connected to a plurality of APs supporting a plurality of different communication technologies via the multi-connectivity technology in 5G communication system, which can obviously facilitate an aggregation and a mergence of different communication technologies and provide better user experience.

For the purpose of convenience, the access node of 5G may be named as 5G-NB with reference to an eNB of LTE. Hereafter, the master access node and the secondary access node to which the UE is connected will be called as M5G-NB and S5G-NB.

Interfaces between a UE and 5G-NBs, e.g. the interface between the UE and M5G-NB and the interface between the UE and S5G-NB, are called as Uu interface and interfaces between 5G-NBs, e.g., interface between a M5G-NB and S5G-NB, are called as X2 interface.

In many scenarios of 5G MC, there are UP and CP traffics between the UE and a M5G-NB and between the UE and the S5G-NB. Particularly, a security key refresh procedure is sometimes required by traffics between the UE and the S5G-NB. The current procedure of refresh of a security key in LTE DC that is specified by specification TS 36.300 and TS 33.401 of 3GPP might not be suitable for the traffics between the UE and the S5G-NB in 5G.

The current procedure of refreshment of a security key in LTE DC will be described below with reference to FIG. 1. FIG. 1 illustrates a signaling flow diagram of refreshing a security key in LTE DC based on TS 36.300 and TS 33.401 of 3GPP. When a secondary eNB (SeNB) of LTE requires to refresh a security key, the SeNB will refresh a security key by using SeNB initiated SeNB modification procedure as described in TS 36.300.

In FIG. 1, at 1, the SeNB first may send a message, e.g., SeNB Modification Required message, to a master eNB (MeNB) of LTE to indicate that it need refresh a security key. At 2, the MeNB may receive the message, e.g., SeNB Modification Required message, from the SeNB and find that the SeNB needs refresh the security key. In response to the request of the SeNB, the MeNB then may generate a new security key for deriving a key $K_{UPenc}$ for both the SeNB and the UE connected to the MeNB and the SeNB. At 3, the MeNB sends a message, e.g., SeNB Modification Request message, containing the newly generated security key to the SeNB to inform the SeNB of the new security key for deriving the new key $K_{UPenc}$. At 4, the SeNB may send a message, e.g., SeNB Modification Request Acknowledge message, to confirm that it receives the new security key from the MeNB after the receipt of the new security key generated by the MeNB. At 5, the MeNB may also send a message, e.g., RRCConnectionReconfiguration message, to the UE to inform the UE of the new security key for deriving the new key $K_{UPenc}$. Then, the UE may perform a configuration with the new security key (i.e., reconfigure the UE) and then send a message, e.g., RRCConnectionReconfigurationComplete message, back to MeNB at 6 to confirm that it applies the configuration with the new security key. After receiving the complete message, e.g., RRCConnectionReconfigurationComplete message, from the UE, the MeNB may send a message, e.g., SeNB Modification Confirm message, to the SeNB at 7 to inform the SeNB of the successful completion of the configuration.

However, after experiencing the above complex procedure, the refreshment of the security key is actually still not completed because the new security key is still not brought into use. In this case, there is a need to initiate a random access (RA) procedure between the UE and the SeNB at 8 to create a timing for bringing the new security key into use because the UE and the SeNB will use the new security key simultaneously when the RA procedure ends. That is, the end of the RA procedure will be treated as a beginning of use of the new security key by both the UE and the SeNB. Thus, the new security key will be brought into use finally at 9 after the random access procedure.

In the above complex procedure for refreshing the security key, there are two interactions between the MeNB and the SeNB, requiring four X2 interface AP signalings, and one interaction between the MeNB and the UE, requiring two Uu interface RRC signalings, which may result in a larger latency. Furthermore, the random access procedure initiated for the purpose of staring use the new security key would interrupt the UP transmission between the UE and the SeNB.

In 5G communication where a higher requirement on the UP transmission is desired, e.g., less latency, uninterrupted UP transmission, etc, the above complex procedure for refreshing a security key is less unacceptable.

SUMMARY OF THE INVENTION

According to a first aspect of the invention, there is a provided a method. The method can comprise generating, by the first network node, a new security key; informing, by the first network node, a user equipment of the new security key and when the first network node will start to use the new security key; obtaining, by the first network node, when the user equipment will start to use the new security key; and bringing, by the first network node, the new security key into use.

According to a second aspect of the invention, there is a provided method. The method can comprise obtaining, by a user equipment, from a first network node a new security key and when the first network node will start to use the new security key; informing, by the user equipment, the first network node when the user equipment will start to use the new security key; and bringing, by the user equipment, the new security key into use.

According to a third aspect of the invention, there is a provided an apparatus. The apparatus can comprise at least one processor, and at least one memory including computer program code, wherein the at least one memory and the computer program code are configured, with the at least one processor, to cause the apparatus to generate a new security key; inform a user equipment of the new security key and when the apparatus will start to use the new security key; obtain when the user equipment will start to use the new security key; and bring the new security key into use.

According to a fourth aspect of the invention, there is a provided apparatus. The apparatus can comprise at least one processor, and at least one memory including computer program code, wherein the at least one memory and the computer program code are configured, with the at least one processor, to cause the apparatus to obtain from a first network node a new security key and when the first network node will start to use the new security key; inform the first network node when the apparatus will start to use the new security key; and bring the new security key into use.

According to a fifth aspect of the invention, there is a provided computer program product. The computer program product can be embodied on a non-transitory medium readably by a computer and comprising program instructions which, when loaded into the computer, execute a computer process comprising the method according to the first and second aspects of the invention.

BRIEF DESCRIPTION OF THE DRAWINGS

In the following the invention will be described in detail by means of preferred embodiments with reference to the attached drawings, in which.

DETAILED DESCRIPTION OF CERTAIN EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 2:
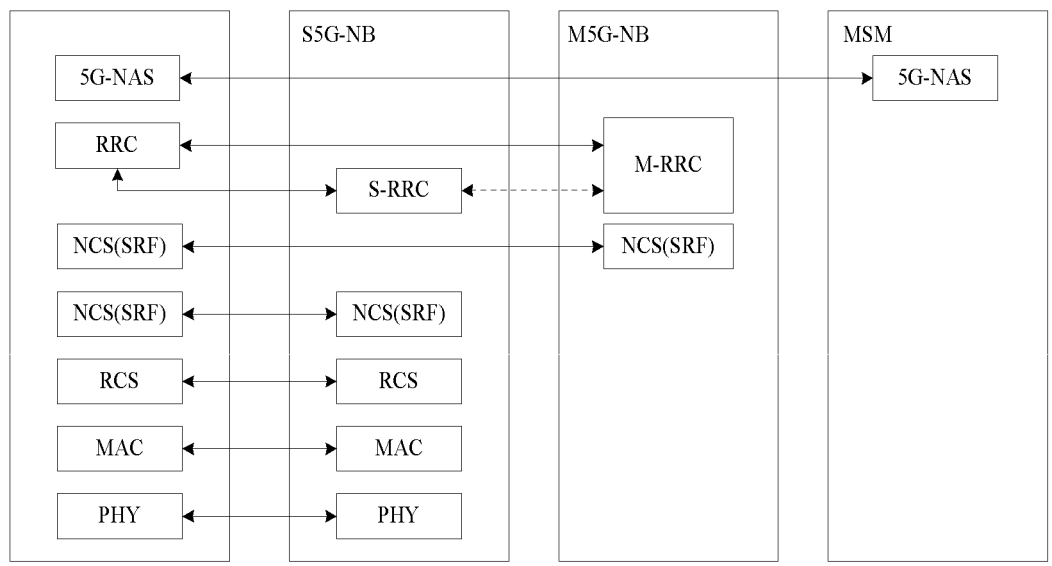
FIG. 2 illustrates a schematic diagram of control plane protocol stack in 5G MC.

FIG. 2 illustrates a schematic diagram of control plane protocol stack in 5G MC. In the fifth generation (5G) multi-connectivity (MC) as shown in FIG. 2, control messages of CP can be transmitted between an UE and a M5G-NB, as indicated by solid line with arrows between a RRC and a M-RRC; control messages of CP can be transmitted between the M5G-NB and a S5G-NB, as indicated by dashed line with arrows between a S-RRC and the M-RRC; control messages of CP can be also transmitted directly between the UE and the S5G-NB, as indicated by solid line with arrows between the RRC and the S-RRC.

As can be seen in FIG. 2, control messages of CP can be transmitted directly between the UE, i.e. RRC and the S5G-NB, i.e. S-RRC without involving the M5G-NB, although the M5G-NB may be a mobility anchor, which is a key difference with Rel-12 DC.

Figure 3:
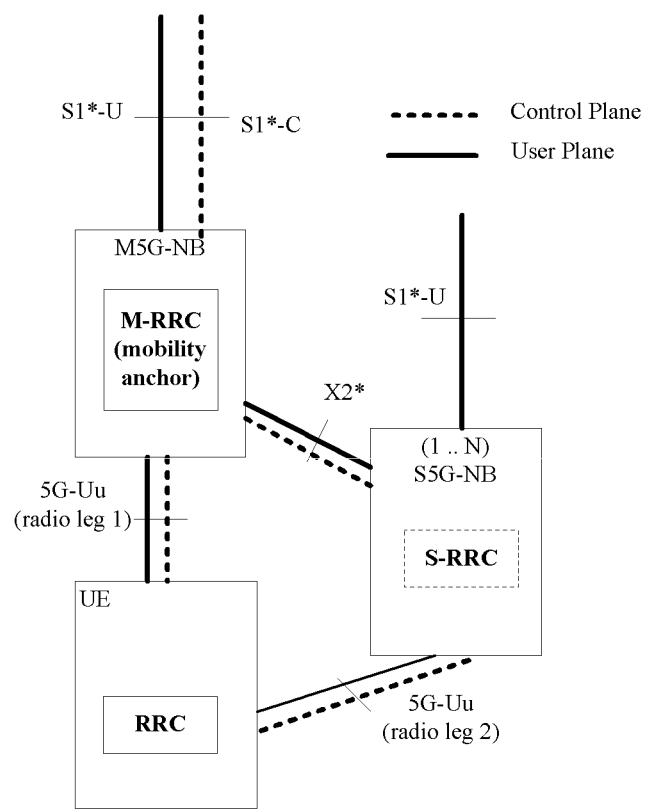
FIG. 3 illustrates a schematic diagram of interfaces between an UE, a MeNB, and a SeNB.

FIG. 3 illustrates a schematic diagram of interfaces between an UE, a M5G-NB, and a S5G-NB. In FIG. 3, it can be seen more intuitively that connections and interface between an UE, a M5G-NB, and a S5G-NB. As stated above, interfaces between a UE and access nodes, e.g. the interface between the UE and M5G-NB and the interface between the UE and S5G-NB, are called as Uu interface. Interfaces between access nodes, e.g., interface between a M5G-NB and S5G-NB, are called as X2 interface.

Figure 1:
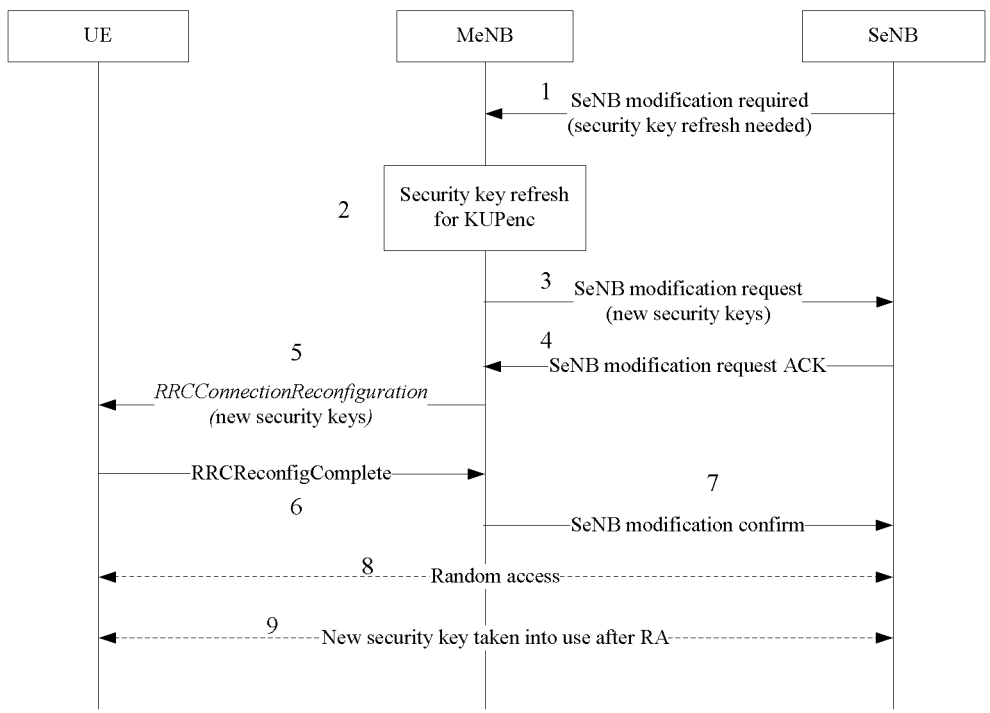
FIG. 1 illustrates a signaling flow diagram of refreshing a security key based on 3GPP TS 36.300.

In LTE scenario different from MC scenarios as illustrated by FIG. 2 and FIG. 3, whenever a security key refresh in NCS/PDCP in SeNB (i.e. secondary access node, also called as AP2 in the case that a MeNB is called as AP1) is needed, SeNB modification request procedure is needed and the MeNB needs to configure UE with the new security keys. Such a complex coordination between UE, MeNB and SeNB will finally take the new security key into use, as stated above in conjunction with FIG. 1.

In this case, the security key refresh procedure described above in conjunction with FIG. 1 may significantly influence the system performance due to a number of signaling between an UE, a MeNB, and a SeNB.

However, by means of MC scenarios as illustrated by FIG. 2 and FIG. 3, the security key refresh procedure described above can be optimized.

A method that will be described hereafter with reference to FIGS. 4-6 will optimize the security key refresh procedure and address the problem stated above.

Figure 4:
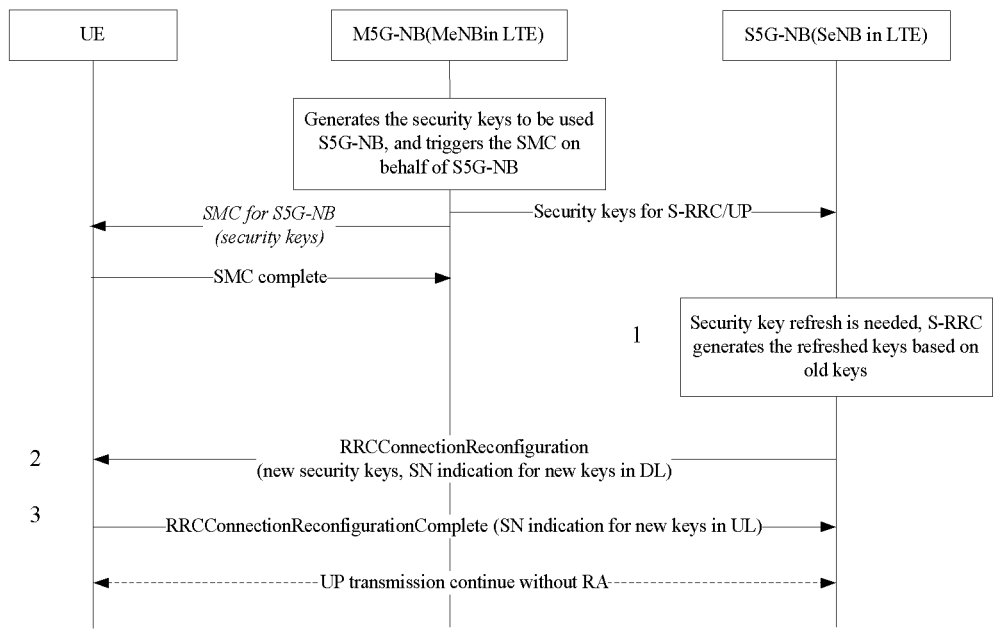
FIG. 4 illustrates a signaling flow diagram of refreshing a security key according to some embodiments of the invention.

FIG. 4 illustrates a signaling flow diagram of refreshing a security key according to some embodiments of the invention.

FIG. 4 illustrates an UE and the first network nodes, i.e., S5G-NB and the second network node, i.e., M5G-NB in 5G MC. One having ordinary skill in the art should understand that although FIG. 4 illustrates two network nodes, there may be a number of network nodes as demand.

In a security mechanism for 5G MC, a M5G-NB may first generate a security key to be used in S5G-NB for both CP (S-RRC) and UP. After the generation of the security key, the M5G-NB may send the security key to a S5G-NB for CP and UP. Then, the M5G-NB may trigger the SMC on behalf of the S5G-NB, that is, the M5G-NB may send the security key to the UE by using SMC. In response to the receipt of the security key, the UE may reply a SMC complete message.

If the S5G-NB wishes to refresh the security key, it should send a message to the M5G-NB to indicate the need of refreshment of the security key based on 3GPP TS 36.300, as described above. That is, the security key refreshment initiated by the S5G-NB must be done by means of M5G-NB as a mediator between the UE and the the S5G-NB.

However, it can be seen from FIG. 2 and FIG. 3 that control message of CP can be transmitted directly between the UE and the first network node, i.e., the S5G-NB without involving the second network node, i.e., the M5G-NB. In this situation, a security key refresh procedure without the M5G-NB is desired.

Therefore, after generating by the M5G-NB security keys to be used in the S5G-NB for both CP (S-RRC) and UP; sending security keys to the S5G-NB; and completing the SMC on behalf of the S5G-NB with the UE that would be combined with SMC between UE and M5G-NB, or via a dedicated RRC SMC procedure, depending on the M5G-NB's implementation, as shown in FIG. 4, if S5G-NB requires to refresh a security key, it may the method according to some embodiments of the invention to refresh a security key.

First the S5G-NB may utilize an S-RRC thereof to generate a new security key, as shown at 1 of FIG. 4. The new security key may be generated by using a newly defined KDF. The input parameters to the newly defined KDF may include a random, an identifier, e.g., PCI, of the S5G-NB, the old security key, etc. One having ordinary skill in the art should understand that above parameters are only an example and the input parameters can include more components.

Since when a SeNB of LTE requires to refresh a security key, it only obtains a new security key for itself by a conventional KDF, i.e., by deriving the new security key based on a new key obtained from a MeNB, in which case, the SeNB interacts inevitably with the MeNB. However, the use of the newly defined KDF may omit a step of obtaining a security key for deriving the security key $K_{UPenc}$ for both the UE and S5G-NB from the second network node, M5G-NB, which may obviously eliminate the need for the SeNB Modification Required message from the S5G-NB to the M5G-NB. Of course, the S5G-NB may still receive the security key for deriving the security key $K_{UPenc}$ for both the UE and S5G-NB from the M5G-NB in some embodiments if desired.

After the generation of the new security key by the S5G-NB, the S5G-NB may inform the UE of the new security key and when the S5G-NB will start to use the new security key, as shown at 2 in FIG. 4. In some embodiments, the means for informing the UE may be sending by the S5G-NB a configuration message to the UE and the configuration message may be RRCConnectionReconfiguration message. In some embodiments, the configuration message, e.g. RRCConnectionReconfiguration message, may include an indication for indicating when the S5G-NB will start to use the new security key in addition to the new security key. In some embodiments, the indication may be a sequence number (SN) for protocol data unit. That is, the SN may indicate the protocol data unit of subsequent protocol data units transmitted to the UE which will start to apply the new security key in DL, i.e., the encryption of subsequent protocol data units with the new security key by the S5G-NB will start with certain protocol data unit of DL that is specified by the indication. In this way, the UE may obtain the knowledge of when it should start to use the new security key to decrypt incoming subsequent protocol data units. In some embodiments, protocol data units transmitted between the UE and the S5G-NB may be PDCP PDU.

Similarly, the UE may obtain from the S5G-NB the new security key and when the S5G-NB will start to use the new security key, as shown at 2 in FIG. 4. In some embodiments, the means for obtaining from the S5G-NB the new security key and when the S5G-NB will start to use the new security key may be receiving by the UE a configuration message from the S5G-NB and in some embodiments, the configuration message may be RRCConnectionReconfiguration message, as described above. In this case, the UE may configure itself with the new security key and know when the S5G-NB will start to use the new security key. In order to have the S5G-NB know when the UE will start to use the new security key to complete the negotiation between the UE and the S5G-NB, the UE must also inform the S5G-NB when the UE will start to use the new security key in order that the new security key has been brought into use finally by sending, in some embodiments, a message, for example, RRCConnectionReconfigurationComplete message, back to the S5G-NB, as shown at 3 in FIG. 4. The RRCConnectionReconfigurationComplete message may also indicate that the UE has completed the configuration with the new security key. In some embodiments, in this message, e.g., RRCConnectionReconfigurationComplete message, there is also an indication for indicating when the UE will start to use the new security key. In some embodiments, the indication may be a sequence number (SN) for protocol data unit. That is, the SN may indicate the protocol data unit of subsequent protocol data units transmitted to the S5G-NB which will start to apply the new security key in UL, i.e., the encryption of subsequent protocol data units with the new security key by the UE will start with certain protocol data unit of UL that is specified by the indication. In this way, the S5G-NB may obtain the knowledge of when it should start to use the new security key to decrypt incoming subsequent protocol data units. In some embodiments, protocol data units transmitted between the UE and the S5G-NB may be PDCP PDU.

In some embodiment, the above indication indicating which protocol data unit will apply the new security key in DL and UL may be the sequence number, SN, for PDCP PDU, as stated above. Since the whole coordination procedure for refreshing the security key when the UE receive the SN from the S5G-NB is still not completed, the SN sent by the S5G-NB to the UE should be large enough to allow the end of the whole coordination procedure. That is, protocol data units of DL that is specified by the SN should not be encrypted with the new security key until the whole coordination procedure is completed.

Alternatively, one having ordinary skill in the art should understand that although the above example uses SN, the indication for indicating when the S5G-NB or the UE will start to use the new security key for encrypting in DL or UL can be any indication for indicating the timing for bringing the new security key into use. In some embodiments, bring the new security key into use for the S5G-NB or the UE may be starting to encrypt protocol data units of DL and decrypt protocol data units of UL with the new security key or starting to encrypt protocol data units of UL and decrypt protocol data units of DL.

By using the message at 2 and 3, the S5G-NB and the UE both know the timing for bringing the new security key into use and there thus is no need for initiating a random access procedure between the UE and the SeNB to create a timing for bringing the new security key into use. Therefore, the UP transmission between the UE and the SeNB would not be interrupted by the random access procedure. In addition, since at least four X2 interface AP signalings are saved, the latency that results from the conventional security key refresh procedure will be reduced according to some embodiments of the invention. Obviously, the above advantage will bring the better user experience in 5G communication system.

Figure 5:
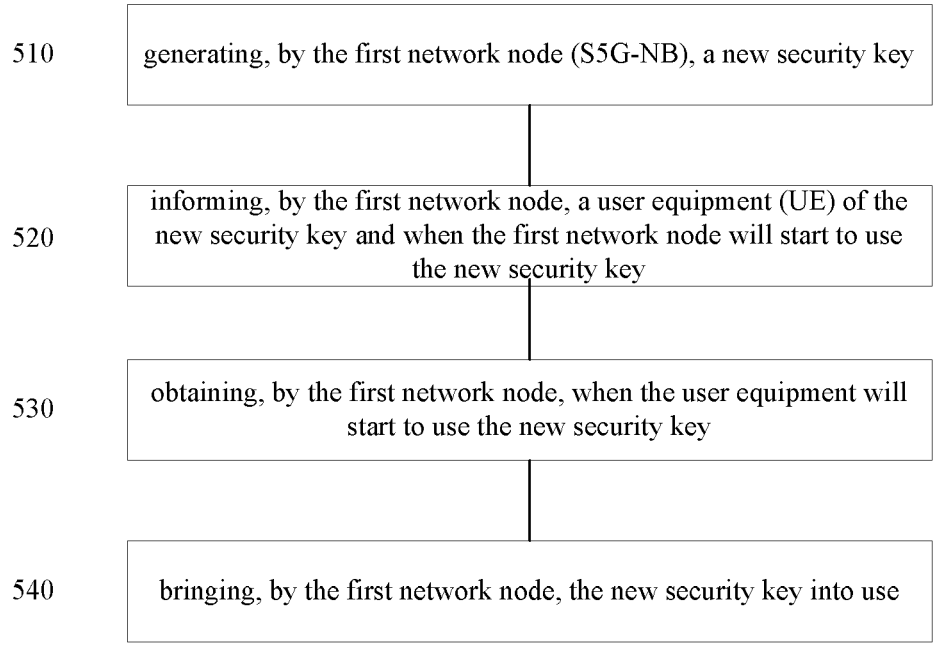
FIG. 5 illustrates a flowchart of method for refreshing a security key at a SeNB according to some embodiments of the invention.

FIG. 5 illustrates a flowchart of method for refreshing a security key at a S5G-NB according to some embodiments of the invention. As shown in FIG. 5, a method can include, at 510, generating, by the first network node (S5G-NB), a new security key. The method can also include, at 520, informing, by the first network node, a user equipment (UE) of the new security key and when the first network node will start to use the new security key. The method can also include, at 530, obtaining, by the first network node, when the user equipment will start to use the new security key. And the method can include, at 540, bringing, by the first network node, the new security key into use.

Figure 6:
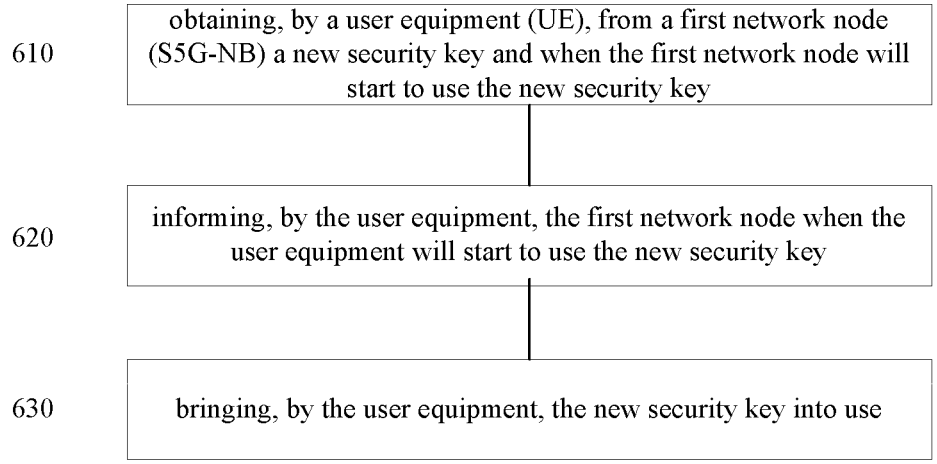
FIG. 6 illustrates a flowchart of method for refreshing a security key at an UE according to some embodiments of the invention.

FIG. 6 illustrates a flowchart of method for refreshing a security key at an UE according to some embodiments of the invention. A method can include, at 610, obtaining, by a user equipment (UE), from a first network node (S5G-NB) a new security key and when the first network node will start to use the new security key. The method can include, at 620, informing, by the user equipment, the first network node when the user equipment will start to use the new security key. And the method can also include, at 630, bringing, by the user equipment, the new security key into use.

Figure 7:
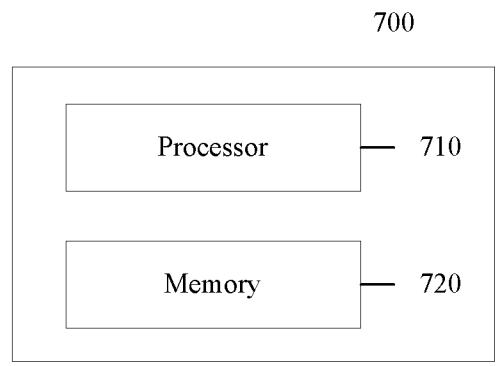
FIG. 7 illustrates a block diagram of an apparatus for refreshing a security key according to some embodiments of the invention.

FIG. 7 illustrates a block diagram of an apparatus 700 for refreshing a security key according to some embodiments of the invention. The apparatus 700 comprises at least one processor 710, at least one memory 720 including computer program code. The at least one memory 720 and the computer program code are configured, with the at least one processor 710, to cause the apparatus to at least perform the method according to FIG. 5.

Figure 8:
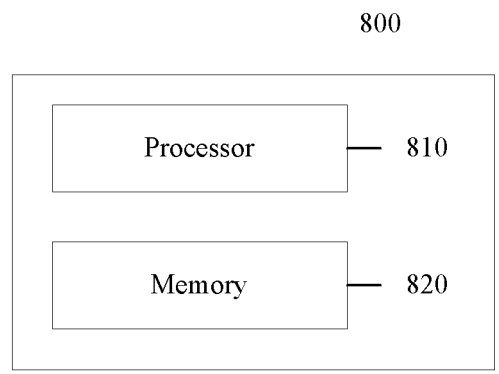
FIG. 8 illustrates a block diagram of another apparatus for refreshing a security key at an UE according to some embodiments of the invention.

FIG. 8 illustrates a block diagram of another apparatus 800 for refreshing a security key at an UE according to some embodiments of the invention. The apparatus 800 comprises at least one processor 810, at least one memory 820 including computer program code. The at least one memory 820 and the computer program code are configured, with the at least one processor 810, to cause the apparatus to at least perform the method according to FIG. 6.

Processors 710 and 810 shown in FIG. 7 and FIG. 8 can be embodied by any computational or data processing device, such as a central processing unit (CPU), application specific integrated circuit (ASIC), or comparable device. The processors can be implemented as a single controller, or a plurality of controllers or processors.

Memories 720 and 820 shown in FIG. 7 and FIG. 8 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to perform any of the methods described herein (see, for example, FIG. 5-6). Therefore, in certain embodiments, a non-transitory computer-readable medium can be encoded with computer instructions that, when executed in hardware, perform a method such as one of the methods described herein. Alternatively, certain embodiments of the invention can be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for a multi-connectivity technology involving a master access node and a secondary access node, the method comprising:

receiving, by the secondary access node, a first security key from the master access node;

detecting, by the secondary access node, that a security key update is needed;

generating, by the secondary access node, a second security key after detecting that the security key update is needed;

informing, by the secondary access node, a user equipment of the second security key and when the secondary access node will start to use the second security key;

obtaining, by the secondary access node, when the user equipment will start to use the second security key; and bringing, by the secondary access node, the second security key into use, wherein the informing comprises sending, by the secondary access node, a radio resource control configuration message to the user equipment, wherein the radio resource control configuration message comprises the second security key and an indication for indicating when the secondary access node will start to use the second security key, wherein the obtaining comprises receiving, by the secondary access node, a radio resource control configuration complete message from the user equipment, and wherein the radio resource control configuration complete message comprises an indication for indicating when the user equipment will start using the second security key.

2. The method of claim 1, wherein the generating, by the secondary access node, the second security key comprises generating the second security key based on a set of parameters, wherein the set of parameters comprises an identifier of the secondary access node or an old security key.

3. The method of claim 2, wherein
the old security key is derived from a security key sent by the master access node.

4. The method of claim 1, wherein the bringing, by the secondary access node, the second security key into use comprises encrypting, by the secondary access node, protocol data units in a downlink with the second security key and decrypting, by the secondary access node, protocol data units in a uplink with the second security key.

5. An apparatus in a multi-connectivity technology involving a master access node and the apparatus, the apparatus comprising:
at least one processor, and
at least one memory including computer program code, wherein the at least one memory and the computer program code are configured, with the at least one processor, to cause the apparatus to:
receive a first security key from the master access node;
detect that a security key update is needed;
generate a second security key after detecting that the security key update is needed;
inform a user equipment of the second security key and when the apparatus will start to use the second security key;
obtain when the user equipment will start to use the second security key; and
bring the second security key into use,
wherein the informing is performed by sending a radio resource configuration message to the user equipment,
wherein the radio resource configuration message comprises the second security key and an indication for indicating when the apparatus will start to use the second security key,
wherein obtaining when the user equipment will start to use the second security key comprises receiving, by the apparatus, a radio resource configuration complete message from the user equipment, and wherein the radio resource configuration complete message comprises an indication for indicating when the user equipment will start using the second security key.

6. The apparatus of claim 5, wherein
the second security key is generated based on a set of parameters,
wherein the set of parameters comprise an identifier of the apparatus or an old security key.

7. The apparatus of claim 6, wherein
the old security key is derived from a security key sent by the master access node.

8. The apparatus of claim 5, wherein
the at least one memory and the computer program code are configured, with the at least one processor, to cause the apparatus to perform the bringing by encrypting protocol data units in a downlink with the second security key and decrypt protocol data units in an uplink with the second security key.

9. A computer program product embodied on a non-transitory computer-readable medium and comprising program instructions which, when loaded into the computer, execute a computer process for a multi-connectivity technology involving a master access node and a secondary access node, the process comprising:
receiving, by the secondary access node, a first security key from the master access node;
detecting, by the secondary access node, that a security key update is needed;
generating, by the secondary access node, a second security key after detecting that the security key update is needed;
informing, by the secondary access node, a user equipment of the second security key and when the secondary access node will start to use the second security key;
obtaining, by the secondary access node, when the user equipment will start to use the second security key; and
bringing, by the secondary access node, the second security key into use,
wherein the informing comprises sending, by the secondary access node, a radio resource control configuration message to the user equipment,
wherein the radio resource control configuration message comprises the second security key and an indication for indicating when the secondary access node will start to use the second security key,
wherein the obtaining comprises receiving, by the secondary access node, a radio resource control configuration complete message from the user equipment, and
wherein the radio resource control configuration complete message comprises an indication for indicating when the user equipment will start using the second security key.

* * * * *